United States Patent [19]

Harmer

[11] Patent Number: 4,572,950
[45] Date of Patent: Feb. 25, 1986

[54] FIBER-OPTICAL PRESSURE DETECTOR

[75] Inventor: Alan L. Harmer, Plan Les Ouates, Switzerland

[73] Assignee: Battelle Memorial Institute, Carouge, Switzerland

[21] Appl. No.: 450,809

[22] Filed: Dec. 17, 1982

[30] Foreign Application Priority Data

Dec. 21, 1981 [CH] Switzerland ............ 8152/81

[51] Int. Cl.⁴ ............................................. G02B 5/14
[52] U.S. Cl. ...................................... 250/227; 324/96; 73/705
[58] Field of Search ................. 250/227; 350/96.12, 350/96.15, 96.29; 324/95, 96; 73/705

[56] References Cited

U.S. PATENT DOCUMENTS 4,342,907 8/1982 Macedo et al. ............. 250/227
4,381,140 4/1983 Van der Hoek et al. ......... 250/227
4,408,829 10/1983 Fitzgerald, Jr. et al. .......... 250/227
4,421,979 12/1983 Asawa et al. ................ 250/227

FOREIGN PATENT DOCUMENTS 2085349 4/1971 United Kingdom .

Primary Examiner—David C. Nelms
Assistant Examiner—J. Gatto
Attorney, Agent, or Firm—Karl F. Ross; Herbert Dubno

[57] ABSTRACT

An optical fiber disposed between a light source and a photodetector is subjected at a number of points, equispaced along its axis, to a transverse pressure causing a significant attenuation of the transmitted luminous radiation. The optimum spacing of the pressure points is a function of the radius of the fiber core and of the refractive indices of its core and its envelope. These pressure points are formed by turns of a substantially incompressible helix which is wound around the fiber and which may be constituted by an internal or external rib of a surrounding flexible sheath of similarly incompressible material. The pressure may be applied by a piezoelectrical transducer and may be modulated by an electrical signal to be picked up by the photodetector.

11 Claims, 10 Drawing Figures

FIBER-OPTICAL PRESSURE DETECTOR

FIELD OF THE INVENTION

My present invention relates to a device for the detection of pressure with the aid of a transluminated optical fiber.

BACKGROUND OF THE INVENTION

It is known that the bending of an optical fiber, juxtaposed with a light source at one end and confronted by a photodetector at the opposite end, attenuates the luminous radiation transmitted therethrough. It has been found, in fact, that the effect of transverse deformation as a means for varying the transmitted radiation can be optimized by applying pressure to the fiber simultaneously at relatively offset, diametrically opposite points equispaced along its axis by a distance determined by its structural and optical parameters. Reference in this connection may be made to a report based on studies by G. Zeidler, published at the Second European Colloquium on Fiber-Optical Transmission held Sept. 27, 1976 in Paris. That report dealt particularly with periodic curvatures introduced in the fibers by a pair of jaws with relatively staggered teeth offset by half the recurrence period of these deformations. This recurrence period is a function of the wavelength of the transmitted light.

Various assemblies of this nature serving for the measurement of mechanical forces are disclosed in Swedish Pat. No. 410,521. The utilization of deformations of a light-guiding structure in an optical strain gauge is the subject matter of my prior U.S. Pat. No. 4,163,397.

The conventional use of jaws with fixedly spaced teeth as a means for periodically deforming an optical fiber has serious drawbacks. Thus, such a pair of jaws can be applied only to a fiber section of limited length and several jaws of identical structure would have to be provided if two or more such sections were to be deformed simultaneously. Alternatively, as taught in the above-identified Swedish patent, the jaws can be widened to accommodate several turns of a fiber looped therearound. The high precision required in the manufacture of their closely spaced teeth makes these devices in either case rather expensive.

OBJECTS OF THE INVENTION

The general object of my present invention, therefore, is to provide an improved device for the detection of pressure by fiber-optical means which is free of the aforementioned drawbacks.

A more particular object is to provide a highly sensitive instrument of this character for converting electrical or mechanical phenomena into luminous signals transmissible over great distances.

SUMMARY OF THE INVENTION

A device according to my present invention comprises, in addition to an optical fiber interposed between a light source and a photodetector as discussed above, pressure-transmitting means encompassing at least a section of that fiber and including a member of substantially incompressible material which is helicoidally wound about the fiber section in a multiplicity of equispaced turns.

U.S. Pat. No. 4,226,504 proposes a system for protecting an optical fiber from mechanical stress with the aid of a soft shock-absorbing thread helically wound about the fiber within a tubular jacket. The recommended spacing of the turns ranges between ¼ and 12 inches, or about 6 and 25 mm. The cushioning effect of the thread and the jacket prevents them from transmitting significant radial pressures to the fiber. In contradistinction thereto, the helicoidally wound member of substantially incompressible material—e.g. a metallic wire—included in a device according to my invention has no shock-absorbing effect but faithfully transmits such radial pressures with resulting deformation of the fibers at points spaced apart by half the pitch of the turns.

Advantageously, pursuant to a more particular feature of my invention, the device further includes a flexible sheath of substantially incompressible material enveloping the fiber—or at least the section thereof which is to be subjected to deformation—as part of the pressure-transmitting means. The helicoidal member, in fact, may be constituted by an internal or external rib of such a protective sheath.

For optimum performance, of course, the pitch of the turns should be so chosen that the axial separation of the pressure points satisfies the periodicity condition referred to above. As will become apparent hereinafter, the optimum separation is on the order of a few millimeters.

BRIEF DESCRIPTION OF THE DRAWING

The above and other features of my invention will now be described in detail with reference to the accompanying drawing in which.

SPECIFIC DESCRIPTION

Figure 1:
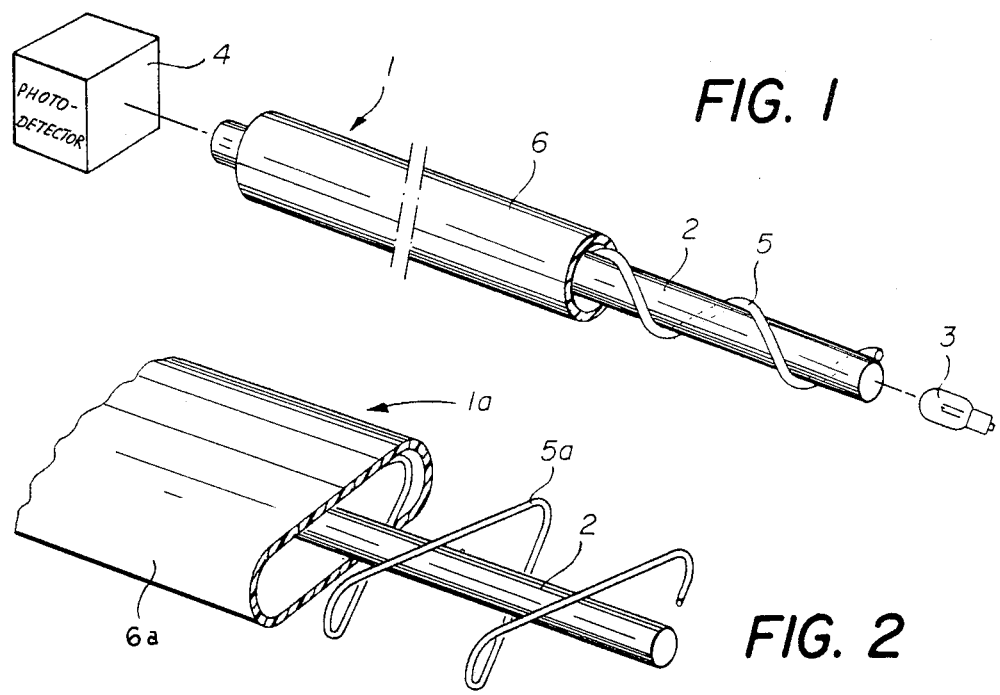
FIG. 1 is a somewhat diagrammatic perspective view, with parts broken away, of a pressure detector embodying my invention.

FIG. 1 illustrates a pressure-detecting device according to my invention comprising a cable 1 which includes an optical fiber 2 with one end illuminated by a light source 3 and another end confronting a photodetector 4. A preferably metallic, substantially incompressible thread 5 is wound helically about fiber 2 within a flexible cylindrical sheath 6 also consisting of a substantially incompressible material, e.g. a metallic or resinous foil.

Figure 10:
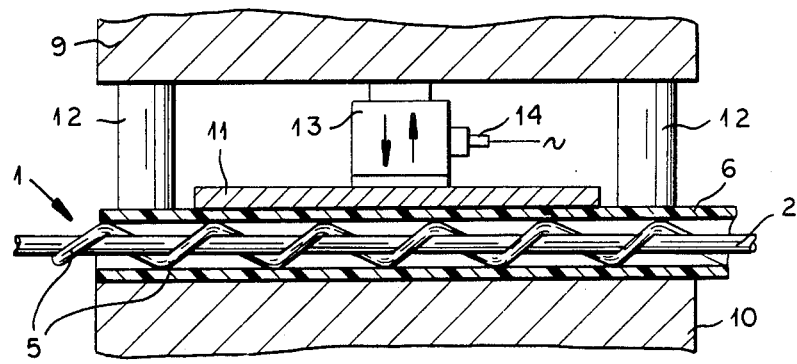
FIG. 10 is a sectional elevational view of part of an apparatus using the device of FIG. 1.

In operation, the cable 1 of FIG. 1 is placed between a pair of flat jaws constituted, for example, by a bed 10 and a pressure plate 11 as illustrated in FIG. 10. Bed 10 is part of a structure also including a lid 9 separated therefrom by columns 12. The space between lid 9 and plate 11 is occupied by a pressure generator 13 such as a piezoelectric transducer expanding and contracting vertically in response to an alternating electrical signal applied to an input 14 thereof. Such piezoelectric transducers are available from the firm Physik Instrumente (PI), Waldbronn/Karlsruhe, German Federal Republic. An expansion of block 13, braced against lid 9, exerts pressure upon plate 11 with resulting relatively inverted deformation of fiber 2 at the zeniths and nadirs of the turns of helical member 5. This deformation, as discussed above, will attenuate the light transmitted through the fiber from source 3 to photodetector 4 (FIG. 1).

The cable 1 of FIGS. 1 and 10, with its sheath 6 of circular cross-section, can be inserted between jaws 10 and 11 in any angular position relative to its axis. The wire coil 5, however, is somewhat compression-resistant so that this device is suitable only for the detection or measurement of pressures above a certain minimum magnitude. A more highly pressure-sensitive cable 1a, partly illustrated in FIG. 2, comprises a wire 5a with flattened turns shrouded by a similarly flattened sheath 6a of generally ellipitical cross-section. The inner width of sheath 6a in the direction of its minor axis corresponds to the fiber diameter plus twice the wire diameter while its width perpendicular thereto is considerably greater. Such a cable 1a can be clamped between the jaws 10 and 11 of the apparatus of FIG. 10 only in two angular positions 180° apart. The resistance of the long legs of the wire loops to radial pressure, however, is considerably less than that of the wire 5 shown in FIG. 1.

Figure 2:
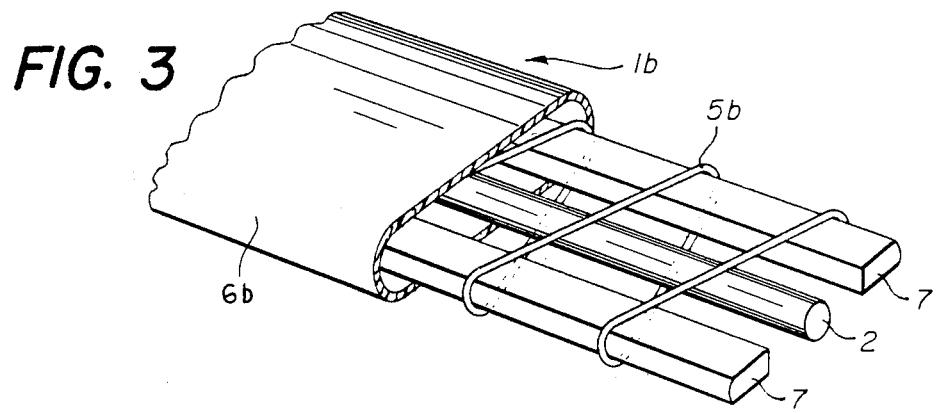
FIG. 2 is a fragmentary perspective view of a modified pressure detector according to my invention.

On the other hand, the heightened deformability of the structure of FIG. 2 prevents its use under elevated pressures. In order to remedy this inconvenience I have shown in FIG. 3 a modification of that structure according to which a cable 1b comprises a wire 5b and a sheath 6b, similar to their counterparts in FIG. 2, along with two metal bars 7 spacedly flanking the fiber 2 within the loops of the wire. The thickness of the bars 7 is slightly less than the fiber diameter, being so chosen as to limit the deformation of the fiber under maximum pressure. Up to that limit, however, wire 5b and sheath 6b are still highly sensitive to transverse pressures exerted for example by an apparatus such as that shown in FIG. 10.

Figures 4, 5:
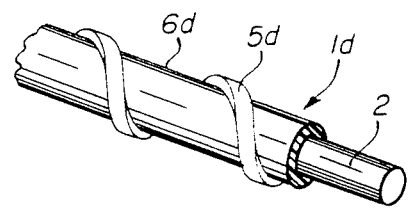

In all instances, the sheath surrounding the fiber may also be made of transparent material to enable visual detection of light escaping from the illuminated fiber. This has been illustrated in FIG. 4 where a transparent sheath 6c, forming part of a cable 1c, has the same tubular shape as sheath 6 of FIG. 1. FIG. 4 also shows that the metal wire of the preceding embodiments could be replaced by a helical or helicoidal rib 5c formed integral with the sheath on its inner surface. A suitable material for the sheath 6c and its rib 5c may be a polyacrylate.

Moreover, it is not absolutely essential that the helicoidally wound member be disposed within the sheath. Thus, as shown in FIG. 5, a cable 1d otherwise similar to those of FIGS. 1–4 has a sheath 6d provided with an external helical rib 5d. The rib could again be integral with the sheath but could also be formed by a partial removal of a layer of metallic or other suitable material bonded to the outer surface of sheath 6d which in this instance closely surrounds the optical fiber 2. When the cable 1d is used in the apparatus of FIG. 10, its jaws 10 and 11 bear of course directly upon member 5d to deform the fiber 2 through the intermediary of sheath 6d.

Optical fibers can also be produced with a helically twisted plane of polarization. See, for example, an article by A. J. Barlow, J. J. Ramskov Hansen and D. N. Payne titled "Birefringence and polarisation mode-dispersion in spun single-mode fibres", published September 1981 in Applied Optics, Vol. 20, page 2962. In such a case the helicoidal pressure-transmitting member ought to be of the same pitch as and aligned with the twisted polarization plane of the fiber.

In the case of ordinary optical fibers, having a core of mean refractive index $n_c$ and an outer zone or envelope of lower refractive index $n_o$, the critical periodicity of the deformations has a wavelength $\Lambda$ given by Field's equation as $$\Lambda = 2\pi/(2\Delta)^{\frac{1}{2}} \tag{1}$$

where r is the radius of the fiber core and $$2\Delta = 1 - n_o^2/n_c^2; \tag{2}$$

thus, equation (1) can be rewritten $$\Lambda = \frac{2\pi r}{\sqrt{1 - \left(\dfrac{n_o}{n_c}\right)^2}} \tag{3}$$

The numerical aperture NA of the fiber is given by $$NA = (n_c^2 - n_o^2)^{\frac{1}{2}} \tag{4}$$

Thus, the refractive core index $n_c$ can be calculated from a determination of the envelope index $n_o$ and the numerical aperture NA.

In a specific instance, a fiber with progressively varying refractive index available under the designation Corning No. 41 292 205 was used. The fiber had a core diameter of 60μ, an envelope diameter of 125μ and a numerical aperture of 0.201. Its attenuation, for light having a wavelength of 820 nm, was 4.2 dB/km. The fiber was found to have an envelope index $N_o = 1.458$ and a core index $n_c = 1.472$. Calculation yielded the values $\Delta = 9.33 \cdot 10^{-3}$ and $\Lambda = 1.380$ mm.

Figure 6:
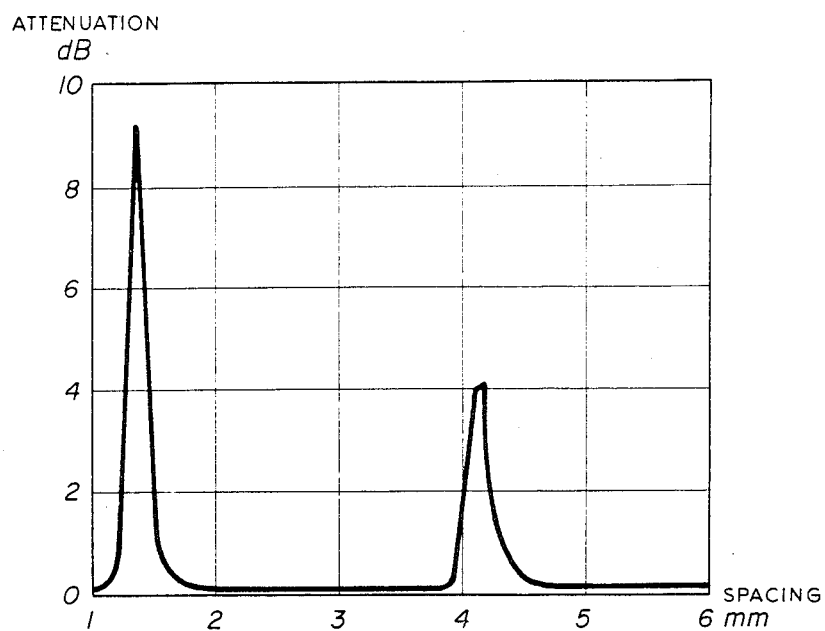
FIGS. 6, 7 and 8 are graphs relating to the operation of my improved pressure detector.
Figure 9:
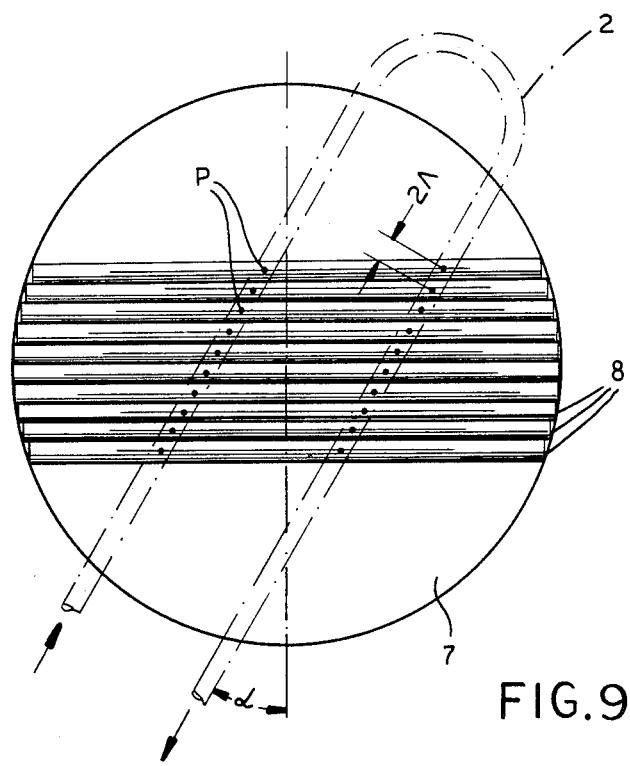
FIG. 9 is a diagrammatic plan view of an implement for determining the optimum periodicity of the pressure points of an optical fiber used in a device according to any of FIGS. 1-5.

For an experimental determination of the critical period $\Lambda$, two sections of that fiber were clamped between a pair of disks each provided on one of its faces with ten closely spaced cylindrical steel pins parallel to one of its diameters; the pins on the two disks were relatively staggered by half their diameter. FIG. 9 shows one such disk 7 together with its pins 8 and a bent fiber 2 including an angle α with a diameter perpendicular to the pins. By changing the angle α, the spacing of the points of contact P between the fiber sections and the pins was varied; for α = 0 that spacing corresponded to the pin diameter. Tests performed with three pairs of such disks, having respective pin diameters of 1.0, 1.5 and 3.0 mm, yielded the graph of FIG. 6 in which attenuation (in dB) is plotted against the spacing of the pressure points P (in mm). The graph shows a principal peak at 1.346 mm which agrees rather well with the calculated value of $\Lambda = 1.380$ mm. Another, smaller peak exists at 4.1 mm corresponding to the third harmonic of the period, i.e. to 3Λ. The clamping pressure was approximately 250 g.

Figure 7:
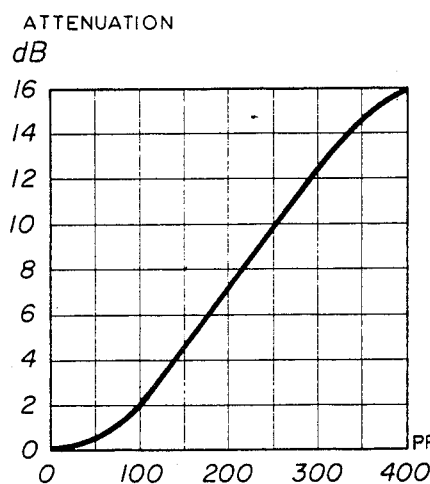

FIG. 7 shows the variation of attenuation, at the optimum spacing Λ of the deformation points P, with clamping pressure (in g). The attenuation is measured for an effective fiber length (encompassing the sections subject to deformation) of 29.92 mm, given by 20Λ with the arrangement of FIG. 9. The curve of FIG. 7 is nearly linear in a range of 100 to 300 grams, with a slope of 0.0526 dB/g representing the pressure sensitivity of the device. At a clamping pressure of 300 g the specific attenuation was 4.67 dB/cm, the calculated distortion of the fiber was 2.85μ and the calculated stress was 16.5 kg/mm².

A series of tests performed with a cable of the structure shown in FIG. 1, including a fiber of the type referred to, yielded results listed in the following Table I. The helical member 5 was a piano wire of 0.1 mm diameter. Tests Nos. 1 and 2 were performed on the same cable with different pitch of the wire, showing the significantly increased sensitivity when that pitch equals 2Λ—i.e. twice the value given in equation (3)—in accordance with test No. 2. Test No. 3 was done without a sheath whereas tests Nos. 4 and 5 used sheaths different from that employed in the first two tests. The two numerical values standing next to the sheath material represent outer and inner diameter. The last four tests were all carried out with the optimum pitch of 2×1.35 mm.

TABLE I

| Test No. | Periodicity (mm) | Sheath | Sensitivity (dB/5 kg) |
|---|---|---|---|
| 1 | 1.2 | Novoplast 1.3/0.5 mm | 1.65 |
| 2 | 1.35 | Novoplast 1.3/0.5 mm | 8.00 |
| 3 | 1.35 | None | 17.10 |
| 4 | 1.35 | Teflon 1.2/0.5 mm | 0.75 |
| 5 | 1.35 | Braiding of copper and Plastosyn 1.8/1.0 mm | 7.10 |

A further test performed on a cable of the type shown in FIG. 1, coiled twice about a cylinder of 1 cm diameter, showed an attenuation of 0.37 dB compared with 0.40 dB for its optical fiber coiled twice about the same cylinder without wire 5 and sheath 6. This test shows that the cable structure reduces the losses introduced in an optical fiber bent around arcs of small radius.

A cable corresponding to that used in test No. 3, but with elongated wire loops (as shown in FIG. 2) having an eccentricity of about 3, was also tested and found to have a sensitivity of 11.1 dB/kg. This is approximately three times the sensitivity measured in test No. 3. When the cable was wound in the aforedescribed manner about a cylinder of 1 cm diameter, the resulting attenuation was 0.20 dB. This indicates that the gain in sensitivity is not obtained at the expense of static losses in bends of significant curvature.

Figure 3:
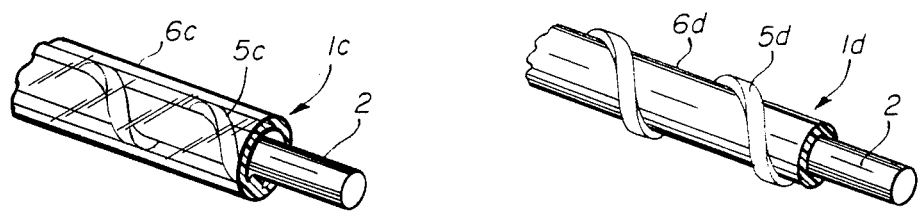
FIGS. 3, 4 and 5 are views similar to that of FIG. 2, illustrating further modifications.

Additional tests were carried out on an unsheathed structure of the kind shown in FIG. 3 whose bars 7 had a thickness of 0.1 mm and a width of 0.5 mm. Member 5b was a steel wire of 0.15 mm diameter spot-welded onto both surfaces of bars 7. With a pitch again chosen according to the optimum periodicity given by Λ=1.35 mm, the maximum static sensitivity of this structure was found to be 0.03 dB/g which is comparable to that obtained for a fiber clamped between toothed jaws (e.g. as shown in the above-identified Swedish Pat. No. 410,521). The loss determined upon a coiling of the structure about a cylinder of 1 cm diameter, as described above, was as low as 0.098 dB.

Figure 8:
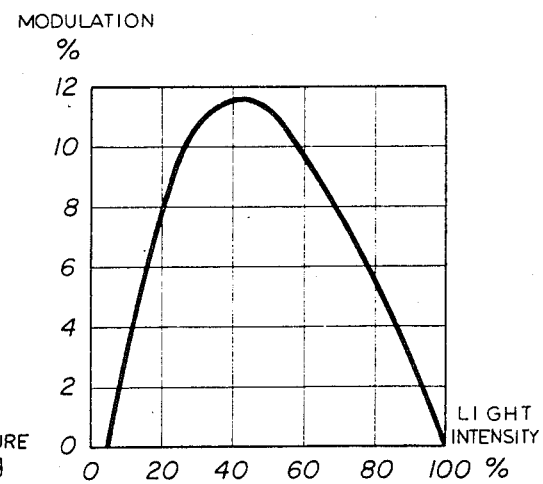

When the same structure was placed in an apparatus of the type illustrated in FIG. 10, depth of modulation (in %) was measured as a function of the intensity of the transmitted light ranging from zero to 100% of the maximum transmissible radiation. The applied excitation signal had a peak-to-peak voltage difference of 20 V which, with a piezoelectric transducer having an expansion coefficient of 1μ per 100 V, corresponded to a displacement of 0.2μ. As shown in FIG. 8, a maximum depth of modulation equal to about 12% was obtained with 40% light transmission. The signal/noise (S/N) ratios for different bandwidths of the applied signal are listed in the following Table II.

TABLE II

| Bandwidth | S/N Ratio |
|---|---|
| 1 Hz | $2.9 \cdot 10^{-3}$ |
| 10 Hz | $1.2 \cdot 10^{-3}$ |
| 5 KHz | $5.4 \cdot 10^{-2}$ |

By dividing the values of the S/N ratio into the aforementioned displacement of 0.2μ, one obtains the minimum displacement necessary for the S/N ratio of 1. With a bandwidth of 1 Hz, according to the first row of Table II, this minimum displacement is as low as 0.69 Å.

The depth of modulation varies substantially linearly with excitation voltage up to a maximum of about 150 V corresponding to a displacement of 1.5μ. This shows that a device according to my invention is highly suitable for utilization as an analog modulator.

I claim:

1. A pressure-detecting device comprising:
an optical fiber;
a light source juxtaposed with one end of said fiber for illuminating same;
a photodetector confronting the opposite end of said fiber for indicating the intensity of light from said source transmitted through said fiber; and
pressure-transmitting means encompassing at least a section of said fiber, said pressure-transmitting means including a member of substantially incompressible material helicoidally wound about said section in a multiplicity of equispaced flattened turns whereby said turns form a helix of oval cross section about said fiber and in contour therewith, said fiber having a core of radius r with a refractive index $n_c$ and an envelope with a refractive index $n_o$ lower than $n_c$, said turns being spaced apart by a distance equal to $$\frac{4\pi r}{\sqrt{1 - \left(\frac{n_o}{n_c}\right)^2}}.$$

2. A device as defined in claim 1 wherein said pressure-transmitting means further includes a flexible sheath of substantially incompressible material enveloping said section of said fiber.

3. A device as defined in claim 2 wherein said member is a rib integral with said sheath.

4. A device as defined in claim 2 wherein said sheath is transparent.

5. A device as defined in claim 2, further comprising a pair of pressure-resistant bars paralleling and bracketing said fiber within said sheath, said bars having a thickness approaching the diameter of said fiber, said turns enveloping said bars.

6. A device as defined in claim 1 wherein said member is a metallic wire.

7. A device as defined in claim 1 wherein said fiber has a twisted plane of polarization, said member being aligned with said plane.

8. In combination, a device as defined in claim 1 and a generator of radial pressure acting upon said fiber through said pressure-transmitting means for varying the intensity of the transmitted light.

9. The combination defined in claim 8 wherein said generator comprises a piezoelectric transducer with an input connected to a supply of modulating signals.

10. A pressure-detecting device comprising:
- an optical fiber;
- a light source juxtaposed with one end of said fiber for illuminating same;
- a photodetector confronting the opposite end of said fiber for indicating the intensity of light from said source transmitted through said fiber; and
- pressure-transmitting means encompassing at least a section of said fiber, said pressure-transmitting means including a flexible sheath of substantially incompressible material enveloping said section of said fiber and in contact therewith, and a helical member attached to and formed on said sheath and provided with a plurality of equispaced turns wound helicoidally around said fiber.

11. The combination defined in claim 10 wherein said fiber has a core of radius r with a refractive index $n_c$ and an envelope with a refractive index $n_o$ lower than $n_c$, said turns being spaced apart by a distance equal to $$\frac{4\pi r}{\sqrt{1 - \left(\frac{n_o}{n_c}\right)^2}}.$$

* * * * *